United States Patent [19]

Lyerly

[11] 4,178,523
[45] Dec. 11, 1979

[54] SWITCH JUMPER STRAP

[75] Inventor: Harold G. Lyerly, Paragould, Ark.

[73] Assignee: Emerson Electric Co., St. Louis, Mo.

[21] Appl. No.: 880,953

[22] Filed: Feb. 24, 1978

[51] Int. Cl.² .......................................... H02K 11/00
[52] U.S. Cl. ................................. 310/71; 310/68 R; 200/293; 339/14 R
[58] Field of Search ................. 310/71, 68 E, 194, 68, 310/273, 68 A; 339/14 R, 222; 200/293; 174/19; 336/107, 192

[56] References Cited

U.S. PATENT DOCUMENTS

| 2,203,806 | 6/1940 | Wolf | 174/19 |
|---|---|---|---|
| 2,934,740 | 4/1960 | Gard | 339/222 |
| 3,573,692 | 4/1971 | Stetson | 339/222 |
| 3,739,323 | 6/1973 | Spors | 310/71 |
| 3,782,669 | 1/1974 | Lewis | 200/293 |
| 4,054,767 | 10/1977 | Anderson | 200/80 |

Primary Examiner—R. Skudy
Attorney, Agent, or Firm—Polster, Polster and Lucchesi

[57] ABSTRACT

A one piece, elongated strip of electrically conductive material is provided with electrical connection means at each end thereof. Preferably, each connection means is bent approximately ninety degrees from the plane of the material strip. The strip serves as a jumper means finding application in dynamoelectric machines employing switch assemblies for connecting the dynamoelectric machine to a source of electrical energy, and speeds interconnection of the switch assembly during motor manufacture.

5 Claims, 2 Drawing Figures

SWITCH JUMPER STRAP

BACKGROUND OF THE INVENTION

This invention relates to connection techniques employed in manufacturing processes for dynamoelectric machines. While the invention is described with particular emphasis with respect to its use in electrical motors, those skilled in the art will recognize the wider applicability of the inventive principles disclosed hereinafter.

Dynamoelectric machines, such as single phase induction motors having at least one main winding and an auxiliary or start winding frequently utilize switch assemblies for selectively controlling a number of circuits. For example, in single phase induction motors, it is common practice to employ a switch to de-energize the start winding once the motor reaches a predetermined operating speed and at the same time to selectively regulate other circuitry. Many different kinds of motors, for example, single and multi speed, and reversible motors incorporate winding circuit controlling swithces which are actuated in response to a particular motor speed. It is desirable for the same basic switch unit to be capable of use in conjunction with the various motors without necessitating extensive modification of the switch assembly. These same motors often are employed in a variety of applications including, for example, domestic appliances which require selective control of both internal motor and external circuits. Consequently, the switch unit assemblies are highly versatile in application.

One form of switch assembly finding general application is shown and disclosed in the U.S. patent to Zagorski, U.S. Pat. No. 3,313,905. In general, this type of switch assembly includes an enclosure having a plurality of electrical terminals extending through the enclosure for making the aforesaid electrical connections. The various terminals are selectively energized through a use of a plunger assembly which is operatively connected to a centrifugal actuator conventionally mounted to the shaft of a rotor assembly of the dynamoelectric machine. When manufacturing the various motor types described above, the switch assembly is mounted to the motor so that the terminals extending through the switch enclosure are accessible after the motor components are assembled. Thereafter, the terminals are selectively interconnected with the motor windings and other external circuits to provide the desired operating characteristics.

In the past, it has been conventional to use a flexible wire jumper between various ones of the terminal as required by the desired switch motor operating characteristics. While this procedure works for its intended purpose, the construction of the flexible jumper itself requires a number of steps including stripping of insulation coating from the particular wire, and crimping the terminal to the wire. As will be appreciated by those skilled in the art, jumper failure often can and does occur at the crimp between the terminal and the flexible wire connector. In addition, confusion can exist in wire placement during motor assembly. That is to say, flexible jumpers can be connected along a variety of locations at the motor switch. It is relatively expensive to presize flexible jumpers to some specific length. In practice, this means both additional care in connecting the jumper and careful inspection of that connection are required.

The invention disclosed hereinafter overcomes these prior art deficiencies by providing a nonflexible, integral jumper formed from a single piece of conductive material. In the preferred form of the invention, the jumper is a single strip of material terminated on each end by a formed electrical connection means compatible with the particular switch assembly terminals being employed. Depending upon the switch terminal configuration and spacing, the strip conductive material can be sized for a particular terminal spacing with respect to the switch assembly, or the jumper can be made to fit a variety of terminal spacings along the switch assembly by selective prestressing of the strip. Since the material strip can be sized easily for a particular applications, it reduces the possible connection alternatives available to an installer, yet simultaneously provides a single size structure that is compatible with various spacing arrangements between terminals at the switch assembly.

One of the objects of this invention is to provide a low cost jumper assembly for a switch assembly of a dynamoelectric machine.

Another object of this invention is to provide a preformed jumper assembly that reduces the possible connection alternatives to the installer of the jumper assembly.

Another object of this invention is to provide a jumper assembly which, although presized, may be formed to a variety of spacings corresponding to the terminal spacing of the switch assembly with which it finds application.

Another object of this invention is to provide a jumper assembly formed from a single piece of material, all the components of the jumper assembly being integrally formed from that single material piece.

Other objects of this invention will be apparent to those skilled in the art in light of the following description and accompanying drawings.

SUMMARY OF THE INVENTION

In accordance with this invention, generally stated, a jumper assembly includes an elongated strip of electrically conductive material. Each end of the jumper assembly has an electrical connector integrally formed from the conductive material. In the preferred embodiment, the connectors are bent at right angles to the conductive material strip, the strip being sized so as to permit the intermounting of the connectors with suitable terminals of a switch assembly of a dynamoelectric machine. The strip may be sized longitudinally for particular applications by selectively bowing, crimping or bending the conductive strip to space the connectors at each end of the material strip. In its motor application, the jumper assembly speeds manufacturing and gives a quick and easy visual reference of the connection employed for the motor.

DESCRIPTION OF THE PREFERRED EMBODIMENT

Figure 1:
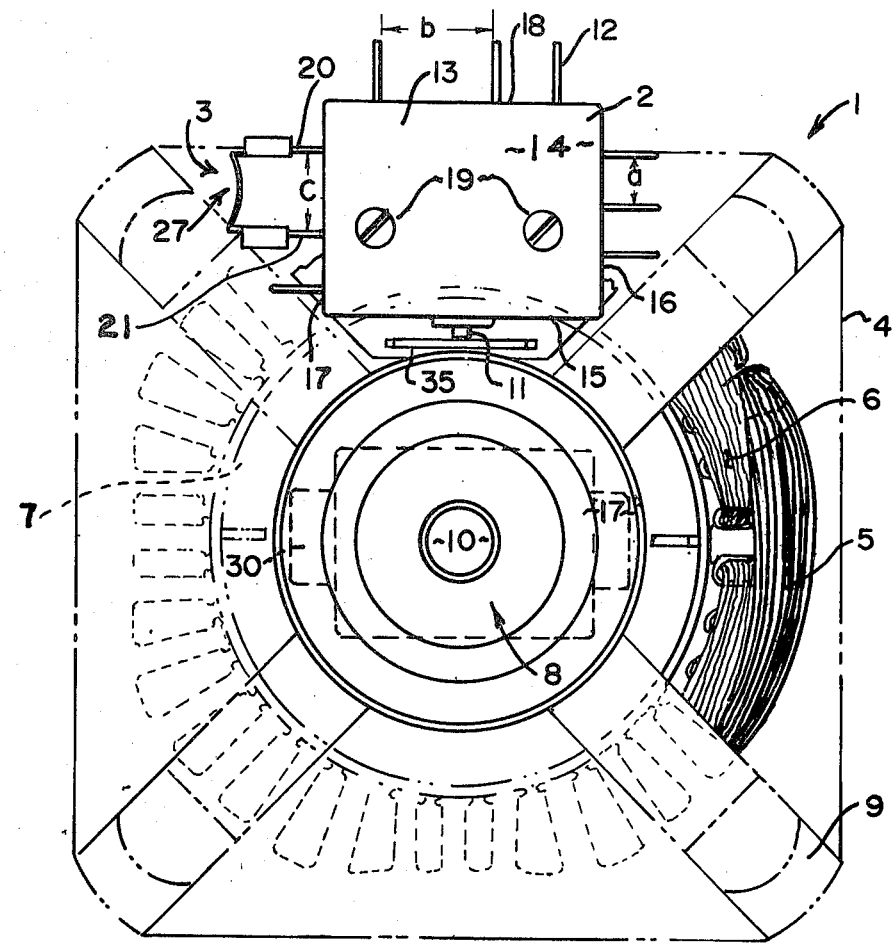
FIG. 1 is a view in end elevation of one illustrative embodiment of dynamoelectric machine employing jumper assembly of this invention.

Referring now to FIG. 1, reference numeral 1 indicates a dynamoelectric machine of the single phase induction motor type employing a switch structure 2, which utilizes one illustrative embodiment of jump means 3 of this invention.

The dynamoelectric machine or motor 1 includes a stator assembly 4, conventionally assembled from a plurality of individual laminations constructed from magnetic material. Commonly, the laminations have a central bore opening and a plurality of closed bottom slots opening onto the central bore. Windings are inserted in and carried along the slots of the stator assembly. Conventionally, the windings include at least one main winding 5 and an auxiliary winding 6 electrically connected to a source of electrical energy through the switch assembly 2.

A rotor assembly 7 is carried in the central bore of the stator assembly 4, and is supported along each end by bearings generally indicated by the numeral 8 mounted in conventional end shields 9. The rotor assembly 7 is mounted for rotation along the bearings 8, the rotor assembly 7 including a shaft 10 extending outwardly from at least one of the end shields 9. The shaft 10 converts the electrical energy applied to the motor windings to physical work.

Conventionally, a centrifugal actuator 30 is mounted to the rotor shaft 10 and includes a lever 35 operatively connected to a plunger 11 of the switch structure 2. The plunger 11 moves upwardly and downwardly, referenced to FIG. 1, to engage and disengage various ones of a plurality of terminals 12 which extend through an enclosure 13 of the switch structure 2.

As shown in FIG. 1, the enclosure 13 of the switch structure 2 is rectangular in plan having a front wall 14, a bottom wall 15, side walls 16 and 17, a top 18 and a back, not shown. A pair of conventional threaded fasteners 19 are used to mount the switch structure 2 at a suitable location along the end shield 9. Mounting may be made directly to the end shield structure or to a separate bracket which in turn is attached to the end shield. The plunger 11 extends through the bottom wall 15 of the enclosure 13 is movably mounted with respect thereto, and functions as described above.

As previously indicated, various ones of the terminals 12 are interconnected so that the switch structure 2 may be utilized with a variety of motor models, regardless of differences between operating characteristics of the various motor models. As shown in FIG. 1, the spacings between sets of the terminals 12 may vary. Thus, for example, some terminals extending through the side 16 may have a spacing A, while pairs of terminals extending through the top 18 may have a spacing B, while terminals extending through the side 17 may have a spacing C. As is observable in FIG. 1, spacing between terminals extending through a particular wall of the enclosure 13 also may vary. Although a particular motor switch connection always will be employed with a particular motor design, situations arise in which the spacing between particular ones of the terminals 12 is important. In the embodiment illustrated, a pair of terminals 20 and 21, respectively, of the terminal plurality 12 are shown as interconnected by the jumper means 3.

Figure 2:
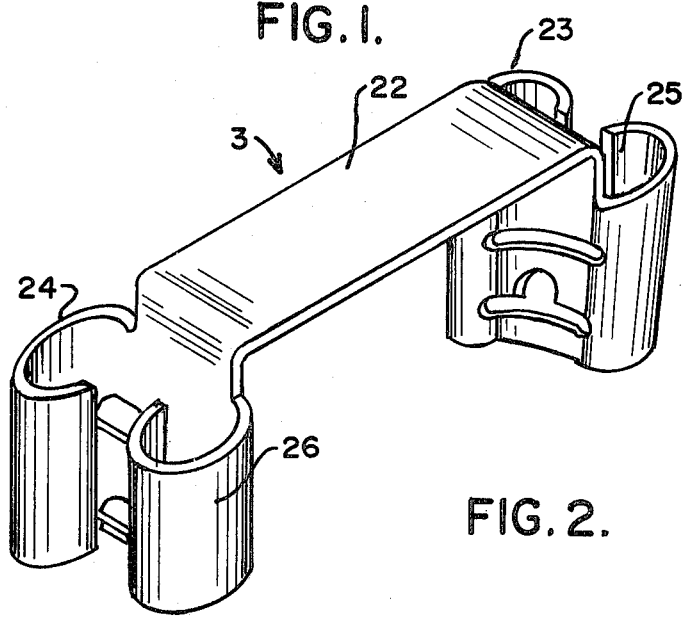
FIG. 2 is a view in perspective of the of jumper assembly employed in FIG. 1.

Jumper means 3, best shown in FIG. 2, is constructed from a single strip 22 of electrically conductive material. The strip 22 has a first end 23 and a second end 24. The ends 23 and 24 each have a suitable connector 25 and a connector 26 integrally formed with the strip 22, from the material of the strip. In the embodiment illustrated, the connectors 25 and 26 have a conventional female receptacle form, which permits their interconnection with the male extensions of the terminal plurality 12 of the switch structure 2. Other connector forms may be employed and such variation is contemplated as being within the scope of the appended claims. The connectors 25 and 26 are bent at right angles to the material strip 22 so that the jumper means 3 has a U-shape silhouette in side elevation.

In order to accommodate the various ranges of terminal spacing A, B and C, the strip 22 is sized so that it can, in its manufactured form shown in FIG. 2, bridge the largest terminal spacing for which interconnection is contemplated. When the bridge between terminal pairs is smaller than the largest contemplated bridge, the strip 22 is bowed as indicted at 27 in FIG. 1, to provide the spacing actually required for a particular application. This is an important feature of my invention, in that the material strip 22 generally is constructed from brass or similar relatively rigid material. The jumper means 3 is preformed so that it predeterminately fits a particular application. This reduces the possibility of misconnections during motor assembly in that a jumper means 3 sized for the spacing C between terminals can not be connected between terminals having spacings A or B under normal conditions, and the jumper means 3 placement is susceptible to easy visual check for correct application.

Numerous variations, within the scope of the appended claims, will be apparent to those skilled in the art in light of the foregoing description and accompanying drawings. Thus, the connectors 25 and 26 may assume other design forms, if desired. Although the bow 27 is shown as a concave bow in FIG. 2, spacing may be achieved by a convex bow, or a material crimp, for example. While certain materials were described as preferred for strip 22 use, other materials may be employed, provided that they have good electrical properties and are relatively rigid so as to be nondeformable except under pressures greater than those normally exerted by hand. These variations are merely illustrative.

Having thus described the invention, what is claims and desired to be secured by Letters Patent is:

1. In a dynamoelectric machine employing a switch structure for electrically interconnecting said dynamoelectric machine to a source of electrical energy, said switch assembly including a plurality of accessible first electrical connector means, the improvement comprising jumper means for interconnecting various ones of said first connector means, said jumper means comprising a one piece, elongated strip of electrically conductive material having a first end and a second end, and a second electrical connector means integrally formed with said material strip at each end thereof, said second electrical connector means being positioned along the ends of said material strip at a right angle to said material strip, said material strip being deformed to adjust the spacing between the second electrical connector means, said second electrical connector means having a female type design complimentary to the design of said first electrical connector means so as to permit interconnection of said first and said second electrical connector means.

2. The improvement of claim 1 wherein said material strip is brass.

3. The improvement of claim 1 wherein said material strip has a bow imparted in it to size the spacing between the second electrical connector means at said first and said second ends.

4. The improvement of claim 3 wherein the bow is concave in side elevation.

5. In a dynamoelectric machine employing a switch structure for electrically interconnecting said dynamoelectric machine to a source of electrical energy, said switch assembly including a plurality of accessible first electrical connector means, the improvement comprising jumper means for interconnecting various ones of said first connector means, comprising a one piece, elongated strip of electrically conductive material having a first end and a second end, said second connector means being positioned along the respective ends of said material strip at an angle offset from the plane of said material strip, said second electrical connector means having a female type connector design complimentary to the design of said first electrical connector means so as to permit interconnection of said first and said second electrical connector means, said material strip being deformed to adjust the spacing between the second connector means.

* * * * *